(12) United States Patent
Lu et al.

(10) Patent No.: US 10,602,134 B1
(45) Date of Patent: Mar. 24, 2020

(54) POST-PRODUCTION DE-MURA OF A TELEVISION USING A MOBILE DEVICE

(71) Applicant: Roku, Inc., Los Gatos, CA (US)

(72) Inventors: Taiquan Lu, San Jose, CA (US); Steve ShawJong Liu, Mountain View, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 16/157,676

(22) Filed: Oct. 11, 2018

(51) Int. Cl.
*H04N 7/173* (2011.01)
*H04N 17/00* (2006.01)
*H04N 9/64* (2006.01)
*G06T 7/00* (2017.01)
*H04N 9/73* (2006.01)

(52) U.S. Cl.
CPC ......... *H04N 17/004* (2013.01); *G06T 7/0002* (2013.01); *H04N 9/646* (2013.01); *H04N 9/73* (2013.01)

(58) Field of Classification Search
CPC ...... H04N 7/173; H04N 17/004; H04N 9/646; H04N 9/73; G06T 7/0002
USPC ............. 725/110, 81, 85; 348/552, 725, 189
See application file for complete search history.

(56) References Cited

U.S. PATENT DOCUMENTS

| | | | |
|---|---|---|---|
| 10,019,928 B2 * | 7/2018 | He | G09G 3/2003 |
| 10,170,063 B2 * | 1/2019 | Zhang | G09G 3/3607 |
| 2018/0047368 A1 * | 2/2018 | Luo | G09G 3/20 |

* cited by examiner

*Primary Examiner* — Trang U Tran
(74) *Attorney, Agent, or Firm* — Sterne, Kessler, Goldstein & Fox P.L.L.C.

(57) ABSTRACT

On-demand, post-production de-mura of a television is described herein. An example system includes a television that comprises a screen and a local de-mura application. The system also includes a mobile device that comprises a mobile de-mura module. In operation, the mobile de-mura module identifies and quantifies mura in the screen of the television for a given IRE index. These operations are repeatedly performed in a measurement loop that iterates over a range of IRE indexes. Raw uniformity data is generated from such iterations. The local de-mura application uses the uniformity data to de-mura the screen and improve gray uniformity performance of the television. Further, the mobile de-mura module and the local de-mura application are configured to fine tune and further de-mura the screen by iterating a verification loop over a range of IRE indexes, wherein operation of the verification loop is substantially similar to operation of the measurement loop.

15 Claims, 4 Drawing Sheets

POST-PRODUCTION DE-MURA OF A TELEVISION USING A MOBILE DEVICE

BACKGROUND

Field

This disclosure is generally directed to improving a television's display performance.

Background

Gray uniformity describes how well a television (TV) is able to maintain a single, uniform color on the screen. Uniformity issues can look like darker patches around the screen, with corners and edges especially susceptible to looking darker than intended. Gray uniformity is particularly an issue for sports, where darker patches on the screen can affect the look of playing surfaces.

For some TVs, uniformity issues are addressed during the manufacturing process, that is, when the TVs are made. During assembly, a given TV is caused to display one or more test images. A system of cameras and processing modules analyze the displayed test images to detect any non-uniformities in the TV's display. Then, the TV is modified while still on the assembly line to compensate for any such non-uniformities.

In Japanese, "mura" means "unevenness; irregularity; lack of uniformity; nonuniformity; inequality." Thus, gray uniformity issues in a TV's display are sometimes call a TV's mura. Similarly, compensating for non-uniformities in a TV's display is sometimes called TV de-mura or simply de-mura.

Performing de-mura while a TV is being made (sometimes called "production de-mura") has a number of drawbacks. First, production de-mura is expensive as it requires an expensive system of cameras and modules that must be integrated into the manufacturing assembly line. Second, production de-mura must be performed at a certain time, because it is part of the assembly line. In other words, there is limited or no flexibility as to when the de-mura process can be performed. Third, and related to the previous point, production de-mura can be time consuming and thus interfere with the smooth operation of the assembly line, thereby delaying the production of TVs. Fourth, by definition, production de-mura can only be performed during the production of the TV. Thus, production de-mura cannot help solve mura that may develop in a TV after it is made and purchased by a customer. Fifth, production de-mura is typically only performed for higher end TVs. Thus, de-mura is often not addressed at all in middle and lower end TVs.

SUMMARY

Provided herein are system, apparatus, article of manufacture, method and/or computer program product embodiments, and/or combinations and sub-combinations thereof, for using a mobile device to perform on-demand, post-production de-mura of a television.

In an example embodiment, a system includes a television that comprises a screen and a local de-mura application. The system also includes a mobile device that comprises a mobile de-mura module. In operation, the mobile de-mura module identifies and quantifies mura in the screen of the television for a given IRE index. These operations are repeatedly performed in a measurement loop that iterates over a range of IRE indexes. Raw uniformity data is generated from such iterations. The raw uniformity data may or may not be pre-processed.

The local de-mura application uses the uniformity data to de-mura the screen and improve gray uniformity performance of the television. Further, the mobile de-mura module and the local de-mura application are configured to fine tune and further de-mura the screen by iterating a verification loop over a range of IRE indexes, wherein operation of the verification loop is substantially similar to operation of the measurement loop.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for using a mobile device to perform on-demand, post-production de-mura of a television.

Figure 1:
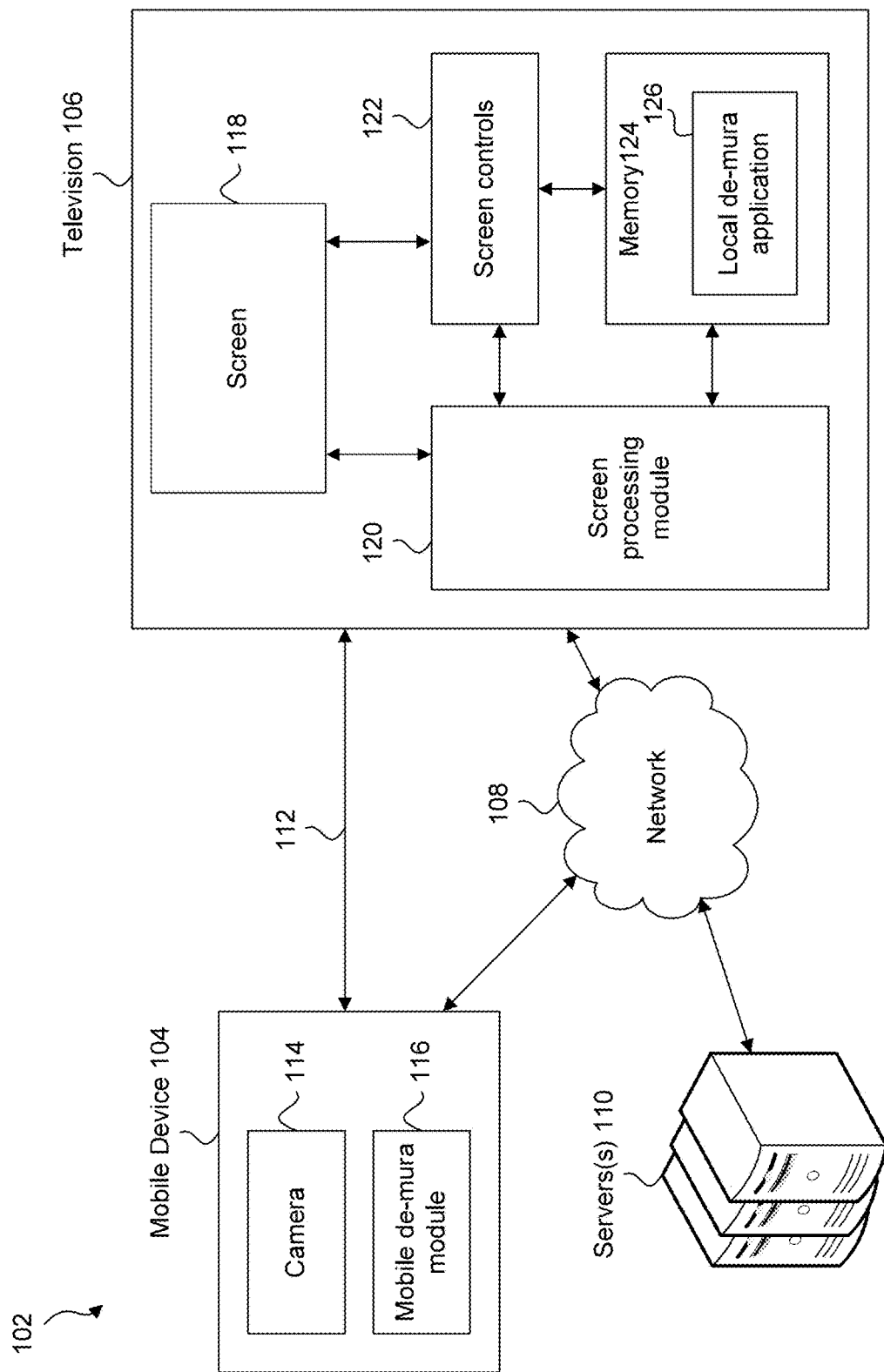
FIG. 1 illustrates a block diagram of using a mobile device for post-production de-mura of a TV, according to some embodiments.

FIG. 1 illustrates a system 102 for on-demand, post-production TV de-mura, according to some embodiments. System 102 includes a television (TV) 106. The TV 106 includes a screen 118 for playing movies, TV shows, computer games, sporting events, etc., to name just some examples. The screen 118 may suffer from mura, that is, unevenness, irregularity, lack of uniformity, inequality, etc., in its display. As will be appreciated by persons skilled in the relevant art(s), mura may be the result of unevenness, irregularity, lack of uniformity, inequality, etc., of the pixels of the screen 118.

In some embodiments, de-mura is performed on the TV 106 in order to improve the gray uniformity performance of the screen 118. This de-mura process is performed after the TV 106 has been manufactured; accordingly, the processing described in this disclosure constitutes post-production de-mura of TVs. Advantages of post-production TV de-mura include:

There are no additional cost to the TV manufacturer, so the cost to consumers is lower.

Post-production de-mura can be used with TVs already sold to consumers.

Post-production de-mura can be performed at any time (as opposed to production de-mura that must be performed at set times defined by the manufacturing process). Since timing is flexible, post-production de-mura can achieve better performance than production de-mura processes.

Post-production de-mura can be performed repeatedly and on-demand, so it can be used to address non-uniformities in TV screens that develop over the life of the TV.

In some embodiments, post-production de-mura of TVs is performed using a mobile device 104. The mobile device 104 may be a smart phone, tablet, laptop computer, wearable, appliance, internet of things device, etc., or any combination thereof. The mobile device 104 may include a camera 114 and a mobile de-mura module 116. The mobile de-mura module 116 may be software and/or hardware operating in the mobile device 104. The mobile device 106 may include any other components and functions typical of the devices listed above.

As noted above, the TV 106 may include a screen 118. The TV 106 may also include a screen processing module 120 for monitoring and adjusting display properties of the screen 118. The screen processing module 120 may include a system-on-chip (SOC). Display properties vary among TVs, and include sharpness, backlight, contrast, brightness, color, hue, gamma, tint, aspect ratio, etc., to name just some examples.

The TV 106 may also include screen controls 122. The screen controls 122 may enable a user to access functionality of the screen processing module 120 to thereby control some or all of the display properties of the screen 118.

In some embodiments, the screen processing module 120 and the screen controls 122 are accessible to an external device, application or agent, such as the mobile de-mura module 116 of the mobile device 104. This can be achieved, for example, by including in the TV 106 an API (application programming interface) by which such external device, application or agent can access, query, command, and/or otherwise interact with the screen processing module 120 and/or the screen controls 122. Also or alternatively, the foregoing can be achieved by enabling the upload of applications into a memory 124 of the TV 106. In the example embodiment of FIG. 1, a local de-mura application 126 has been uploaded into the memory 124 of the TV 106.

As will be described, the mobile de-mura module 116 in the mobile device 106 controls and interacts with the local de-mura application 126 in the television 106 to de-mura and improve the gray uniformity performance of the TV screen 118, on an on-demand and post-production basis.

The mobile device 104 and the television 106 may be configured to communication with a network 108. In various embodiments, the network 108 can include, without limitation, wired and/or wireless intranet, extranet, Internet, cellular, Bluetooth and/or any other short range, long range, local, regional, global communications network, as well as any combination thereof. The mobile device 104 and television 106 can be configured to communicate directly with each other using any of these means, as indicated by 112. One or more servers 110 may be accessible to the mobile device 104 and/or TV 106 via the network 108.

Figure 2:
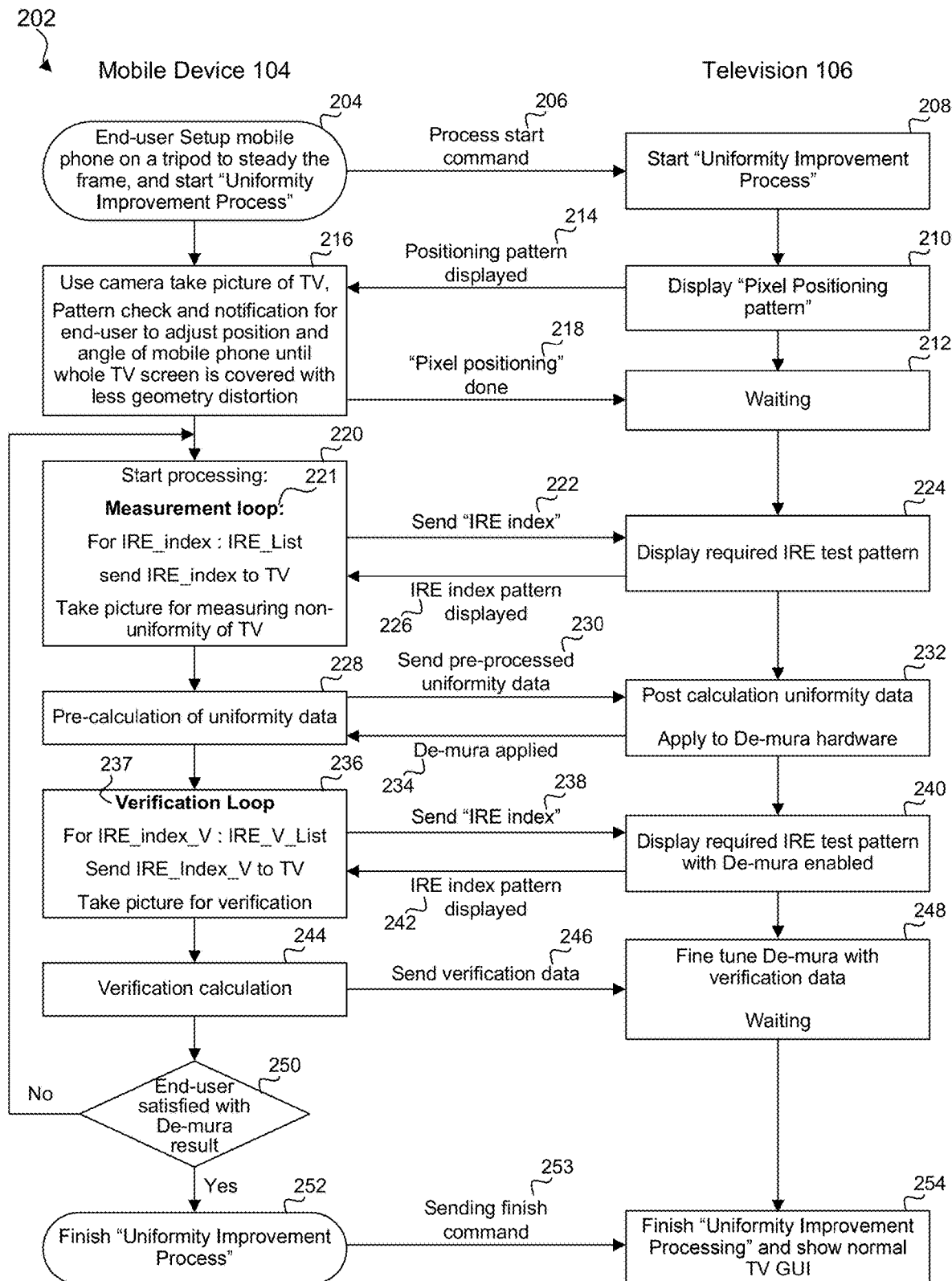
FIG. 2 illustrates a flowchart for using a mobile device for post-production de-mura of a TV, according to some embodiments.

FIG. 2 illustrates a method 202 for on-demand, post-production TV de-mura, according to some embodiments. Method 202 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of skilled in the relevant art(s). Method 202 shall be described with reference to FIGS. 1 and 3. However, method 202 is not limited to those example embodiments.

In method 202, the left hand shows operations performed by the mobile device 104 under the control of the mobile de-mura module 116, and the right hand shows operations performed by the TV 106 under the control of the local de-mura application 126.

In 204, a user may mount the mobile device 104 on a tripod (not shown in FIG. 1). Use of a tripod is optional, and the user may instead position the mobile device 104 using other object(s) (such as on top of a stack of books) or may manually hold the mobile device 104. The user positions the mobile device 104 so the lens of the camera 114 is pointed at the screen 118 of the TV 106. In some embodiments, the user adjusts the mobile device 104 until the entire screen 118 is within the view of the camera 114.

Also in 204, the mobile device 104 (at the command of the user, or under its own control) may inform the TV 106 that a de-mura process is beginning. The mobile device 104 may perform this function by transmitting a start command 206 to the TV 106.

In response, in 208, the TV 106 may begin a uniformity improvement (that is, TV de-mura) process. Specifically, in 210, the TV 106 displays on the screen 118 a pixel positioning pattern. The pixel positioning pattern may be internally stored in the TV 106 or may be provided as part of the start command 206. Alternatively, the TV 106 may obtain a pixel positioning pattern from a server 110 via the network 108.

Figure 3:
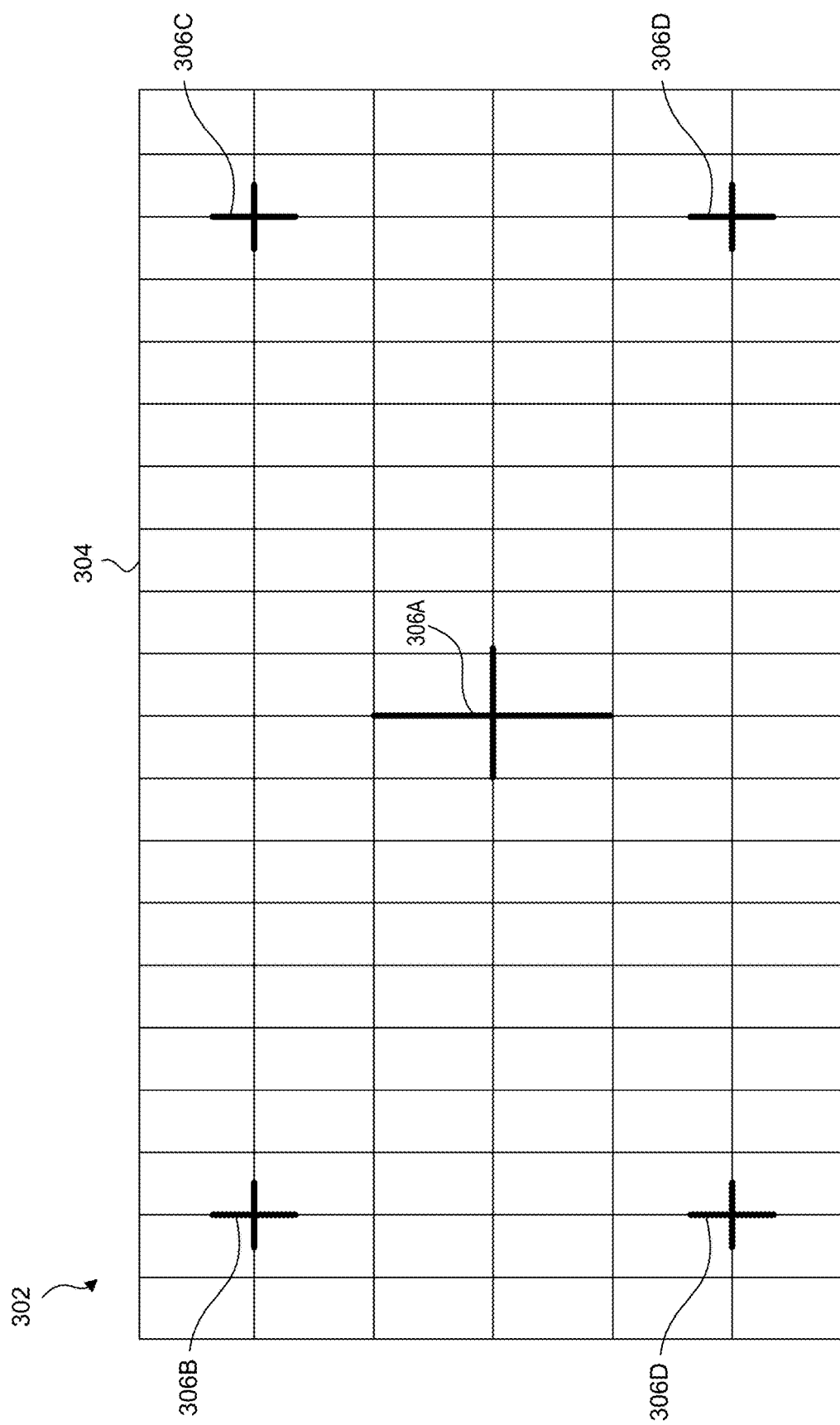
FIG. 3 illustrates an example pixel positioning pattern, according to some embodiments.

An example pixel positioning pattern 302 is illustrated in FIG. 3, according to some embodiments. The pixel positioning pattern 302 includes a uniform grid 304 and five crosses 306. Four of the crosses 306B-306E are the same size and a centrally positioned cross 306A is a larger size. It should be understood that the example pixel positioning pattern 302 of FIG. 3 is provided solely for illustrative purposes, and other pixel positioning patterns could instead be used. After displaying the pixel positioning pattern 302 on the screen 118, the TV 106 may send a positioning pattern displayed message 214 to the mobile device 104. Thereafter, as shown by 212, the TV waits 106 for further commands.

Upon receipt of the positioning pattern displayed message 214 or at the command of the user, the mobile device 104 in 216 uses the camera 114 to take a picture of the pixel positioning pattern 302 being displayed on the screen 118. The mobile device 104 may adjust the parameters of the camera 114 (such as focus, zoom, etc.) until the entire pixel positioning pattern 302 (including the grid 304 and the crosses 306) are in the picture and in focus. The mobile device 104 may also display a message to the user, to request that the user re-position the mobile device 104, to better enable the camera 114 to take a picture of the screen 118 that is in focus and includes the entire pixel positioning pattern 302. Step 216 may be repeated until the foregoing is achieved. Thereafter, the mobile device 104 may optionally send a pixel positioning done message 218 to the TV 106.

In 220, a measurement loop 221 may be performed to identify and quantify any mura (that is, any unevenness; irregularity; lack of uniformity; nonuniformity; inequality; etc.) in the pixels of the TV screen 118. Accordingly, in 220, the mobile de-mura module 116 transmits an IRE index message 222 to the TV 106. The IRE index message 222 may contain an IRE index (which may be herein called the "current IRE index" for the iteration of the measurement loop 221 being performed). IRE stands for Institute of Radio Engineers and is a unit used in the measurement of composite video signals. IRE covers the spectrum of the blackest picture (with an IRE index of 0) to the whitest picture (with an IRE index of 100). In some embodiments, the measurement loop 221 of step 220 iterates from IRE 0 to IRE 100, with the size of the increments based on the amount of mura found in the TV screen 118. Specifically, in some embodiments, if the amount of mura found in the TV screen 118 is high, then the increment size is made smaller in order to more accurately characterize, quantify and ultimately compensate for the mura. Similarly, if the amount of mura found in the TV screen 118 is low, then the increment size is made higher since less de-mura is needed. In this way, processing resources of the mobile device 104 and TV 106 are saved if less de-mura is needed.

In 224, the TV screen 118 displays a gray scale image corresponding to the current IRE index contained in the IRE index message 222. The gray scale image may be stored in the TV 106, provided with the IRE index message 222, or retrieved from a server 110 via the network 108.

Then in 224, the local de-mura application 126 operating in the TV 106 may transmit an IRE index pattern displayed message 226 to the mobile device 104. In response, the mobile de-mura module 116 in the mobile device 104 continues the measurement loop 221 by causing the camera 114 to take a picture of the TV screen 1108. Then, the mobile de-mura module 116 analyzes the pixels of the TV screen 1108 as represented in the picture. As will be appreciated by persons skilled in the relevant art(s), if there was no mura, then the display characteristics of all the pixels would be the same, or substantially the same. Accordingly, as part of the measurement loop 221, the mobile de-mura module 116 identifies and quantifies any unevenness, irregularity, lack of uniformity, nonuniformity, inequality, etc., between the pixels of the display screen 118 corresponding to the current IRE index. For example, and without limitation, by analyzing the picture taken by the camera 114, the mobile de-mura module 116 may determine the differences in luminance and/or RGB (red-green-blue) between the pixels of the display screen 118 corresponding to the current IRE index.

Then, continuing the measurement loop 221, the mobile de-mura module 116 selects the next IRE index, and transmits that IRE index to the TV 106 in a new send IRE index message 222. As noted above, the increment of the IRE index will be smaller if the pixel differences are determined to be larger. Similarly, the increment of the IRE index will be larger if the pixel differences are determined to be smaller. Steps 220 and 224 are repeated until the measurement loop 221 iterates through IRE index 0 to IRE index 100 (or some other predetermined or implemented dependent IRE index boundaries and order).

After the completion of step 220, the mobile de-mura module 116 has collected data (sometimes called "raw uniformity data") that characterizes and quantifies the mura (that is, any unevenness; irregularity; lack of uniformity; nonuniformity; inequality; etc.) in the pixels of the TV screen 118 for the IRE spectrum over which the measurement loop 221 iterated. In some embodiments, the mobile de-mura module 116 may transmit such raw uniformity data to the local de-mura application 126, to use for de-mura'ing and otherwise improving the gray uniformity performance of the TV screen 118. But, the raw uniformity data may be huge in quantity. As such, transmitting the raw data to the TV 106 may take a substantial amount of time and use significant communication bandwidth. Also, depending on the processing capabilities of the TV 106, the local de-mura application 126 may not be capable of processing the raw data in a time efficient manner to achieve satisfactory de-mura results.

Accordingly, in some embodiments, the mobile de-mura module 116 performs 228. In 228, the mobile de-mura module 116 pre-processes the raw data. The tasks included with such pre-processing are implementation dependent and may be customized to the capabilities and specifications of the TV 106 currently being processed. Information of the specific capabilities and specifications of the TV 106 may be stored in the mobile de-mura module 116 or accessed from a server 110 via the network 108. In various embodiments, the pre-processing may include compressing the raw data, changing the raw data to another form (such as a bit mapped format), collapsing the raw data to represent blocks of the display screen 118 (instead of each individual pixel), converting the raw data into a format or language supported by the screen processing module 120, etc., or any combination of the foregoing.

The mobile de-mura module 116 in 228 transmits the pre-processed uniformity data 230 to the TV 106. In 232, the local de-mura application 126 further processes the pre-processed uniformity data 230. The tasks included with such further processing may depend on the capabilities and specifications of the screen processing module 120 and the screen controls 122. For example, the local de-mura application 126 may translate the pre-processed uniformity data 230 to a format or language supported by the screen processing module 120. Also or alternatively, the local de-mura application 126 may identify and utilize only those portions of the pre-processed uniformity data 230 that correspond to display controls supported by the screen controls 122 and screen processing module 120. For example, some TVs 106 may not support hue or gamma controls, so the local de-mura application 126 may de-emphasize aspects of the pre-processed uniformity data 230 pertaining to those display characteristics.

Then in 232, the local de-mura application 126 may apply the processed uniformity data to the screen controls 122 and the screen processing module 120 to address and compensate for the de-mura in the TV screen 118 identified in step 220. The local de-mura application 126 may use any well known de-mura and/or gray uniformity approach, method, technique, algorithm and/or technology to perform this function. As just one non-limiting example, the processed uniformity data may indicate an imbalance in RGB of the TV screen 118, with red being more prominent than blue. The processed uniformity data may also indicate that parts of the TV screen 118 are darker than other parts. In this example, the local de-mura application 126 in step 232 would access and control the screen controls 122 and the screen processing module 120 to balance the RGB and adjust the brightness and/or contrast so they are uniform. After performing de-mura, the local de-mura application 126 may send a de-mura applied message 234 to the mobile device 104.

After receiving the de-mura applied message 234, the mobile de-mura module 116 in 236 may perform a verification loop 237. The purpose of the verification loop 237 is to confirm that the processing of steps 220, 224, 228 and 232 were successful to remove mura from the pixels of the TV screen 118. The operation steps 236 and 240 are the same as steps 220 and 224, respectfully. However, steps 220 and 224 were perform before de-mura processing, and steps 236 and 240 are performed after de-mura processing.

Accordingly, after completion of step 236, the mobile de-mura module 116 has collected raw uniformity data that characterizes and quantifies any remaining mura in the pixels of the TV screen 118 over the IRE spectrum that was iterated in the verification loop 237 of step 236. Then, in step 244, the mobile de-mura module 116 may pre-process this raw uniformity data; step 244 operates in the same way as step 228. This pre-processed data—sometimes called verification data 246—is transmitted to the TV 106. The local de-mura application 126 may further process the verification data 246, and use the processed verification data to control the screen controls 122 and screen processing module 120 to fine tune the de-mura and further improve the gray uniformity performance of the TV 106. Operation of step 248 is the same as step 232.

Thereafter, in some embodiments, the user in 250 views the TV screen 118 and indicates if he is satisfied with the de-mura process. The user may provide his indication by pressing a button or swiping on the mobile device 104. If the user is not satisfied, then the de-mura process repeats by returning to step 220. Otherwise, in 252, the mobile device 104 sends a finish command 253 to the TV 106. In 254, the TV 106 terminates its de-mura processing and displays a normal TV graphical user interface (GUI).

In this way, embodiments of this disclosure achieve post-production de-mura of a television. Such processing is on-demand and can be repeatedly performed. Also, after the de-mura process is initiated in step 204, the method 202 may be automatically performed by the mobile device 104 and the TV 106 without any user involvement.

Example Computer System

Figure 4:
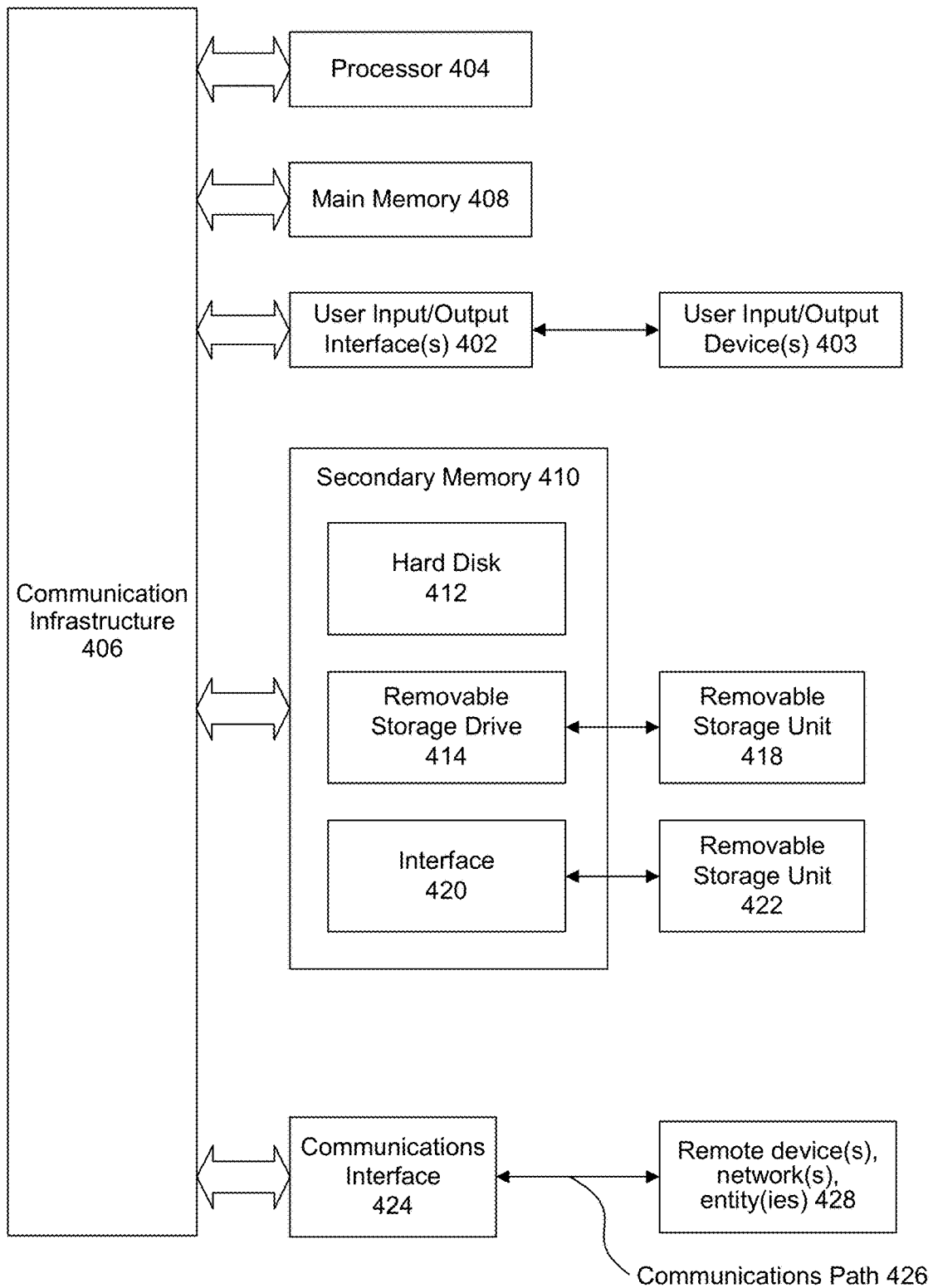
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 or portions thereof can be used to implement the mobile device 104 and/or television 106, or portions thereof.

Computer system 400 includes one or more processors (also called central processing units, or CPUs), such as a processor 404. Processor 404 is connected to a communication infrastructure or bus 406.

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
a television having a screen and a local de-mura application;
a mobile device having a mobile de-mura module;
wherein the mobile de-mura module is configured to identify and quantify mura in the screen of the television, and provide uniformity data characterizing the mura to the local de-mura application; and to identify and quantify mura in the screen of the television, the mobile de-mura module is configured to:
(a) select an IRE index;
(b) send the IRE index to the local de-mura application, wherein the local de-mura application causes the screen to display an image corresponding to the IRE index;
(c) cause a camera in the mobile device to take a picture of the screen; and
(d) analyze the picture to identify non-uniformities among pixels of the screen; and
wherein the local de-mura application is configured to use the uniformity data to de-mura the screen and improve gray uniformity performance of the television.

2. The system of claim 1, wherein (a)-(d) are performed in a measurement loop that iterates over a range of IRE indexes, and wherein raw uniformity, data is generated from iterating the measurement loop over the range of IRE indexes.

3. The system of claim 2, wherein the mobile de-mura module is further configured to pre-process the raw uniformity data to generate pre-processed uniformity data.

4. The system of claim 2, wherein to de-mura the screen and improve gray uniformity performance of the television, the local de-mura application is configured to:
access and control display controls in the television according to raw uniformity data or pre-processed uniformity data to de-mura pixels in the screen of the television.

5. The system of claim 4, wherein the mobile de-mura module and the local de-mura application are further configured to fine tune and further de-mura the screen by iterating a verification loop over a range of IRE indexes, wherein operation of the verification loop is substantially similar to operation of the measurement loop.

6. A method in a mobile device for post-production de-mura of a screen of a television, comprising:
identifying and quantifying mura in the screen of the television;
providing uniformity data characterizing the mura to a local de-mura application in the television; and
wherein the local de-mura application uses the uniformity data to de-mura the screen and improve gray uniformity performance of the television, and wherein the identifying and quantifying comprises:
(a) selecting an IRE index;
(b) sending the IRE index to the local de-mura application, wherein the local de-mura application causes the screen to display an image corresponding to the IRE index;
(c) causing a camera in the mobile device to take a picture of the screen; and
analyzing the picture to identify non-uniformities among pixels of the screen.

7. The method of claim 6, wherein (a)-(d) are performed in a measurement loop that iterates over a range of IRE indexes, and wherein raw uniformity, data is generated from iterating the measurement loop over the range of IRE indexes.

8. The method of claim 7, further comprising pre-processing the raw uniformity data to generate pre-processed uniformity data.

9. The method of claim 7, further comprising:
fine tuning to further de-mura the screen by iterating a verification loop over a range of IRE indexes, wherein operation of the verification loop is substantially similar to operation of the measurement loop.

10. The method of claim 6, wherein the local de-mura application operates to de-mura the screen by accessing and controlling display controls in the television according to raw uniformity data or pre-processed uniformity data to de-mura pixels in the screen of the television.

11. A tangible computer-readable device having instructions stored thereon that, when executed by at least one computing device in a mobile device, cause the at least one computing device to perform operations comprising:
identifying and quantifying mura in a screen of a television;
providing uniformity data characterizing the mura to a local de-mura application in the television; and
wherein the local de-mura application uses the uniformity data to de-mura the screen and improve gray uniformity performance of the television, and wherein the identifying and quantifying comprises:

(a) selecting an IRE index;
(b) sending the IRE index to the local de-mura application, wherein the local de-mura application causes the screen to display an image corresponding to the IRE index;
(c) causing a camera in the mobile device to take a picture of the screen; and
(d) analyzing the picture to identify non-uniformities among pixels of the screen.

12. The tangible computer-readable device of claim 11, wherein (a)-(d) are performed in a measurement loop that iterates over a range of IRE indexes, and wherein raw uniformity data is generated from iterating the measurement loop over the range of IRE indexes.

13. The tangible computer-readable device of claim 12, further comprising pre-processing the raw uniformity data to generate pre-processed uniformity data.

14. The tangible computer-readable device of claim 12, further comprising:
   fine tuning to further de-mura the screen by iterating a verification loop over a range of IRE indexes, wherein operation of the verification loop is substantially similar to operation of the measurement loop.

15. The tangible computer-readable device of claim 11, wherein the local de-mura application operates to de-mura the screen by accessing and controlling display controls in the television according to raw uniformity data or pre-processed uniformity data to de-mura pixels in the screen of the television.

* * * * *